(12) United States Patent
Rapp

(10) Patent No.: US 7,314,611 B2
(45) Date of Patent: Jan. 1, 2008

(54) SOLUTION AND METHOD FOR TREATING ORGANIC WASTE

(76) Inventor: Gary L. Rapp, I R.R. #1, Box 177, Athens, IL (US) 62613

( * ) Notice: Subject to any disclaimer, the term of this patent is extended or adjusted under 35 U.S.C. 154(b) by 839 days.

(21) Appl. No.: 10/688,234

(22) Filed: Oct. 17, 2003

(65) Prior Publication Data

US 2004/0069240 A1    Apr. 15, 2004

Related U.S. Application Data

(63) Continuation-in-part of application No. 10/292,556, filed on Nov. 12, 2002, now Pat. No. 6,997,139.

(60) Provisional application No. 60/354,677, filed on Feb. 5, 2002.

(51) Int. Cl.
| | | |
|---|---|---|
| A61L 9/013 | (2006.01) | |
| A61L 11/00 | (2006.01) | |
| A01N 37/04 | (2006.01) | |
| A01N 31/00 | (2006.01) | |
| A01N 65/00 | (2006.01) | |

(52) U.S. Cl. .................. 424/76.6; 424/76.5; 424/76.7; 424/742; 424/750; 514/574; 514/724; 422/5

(58) Field of Classification Search ............... 424/76.7, 424/76.5, 76.6
See application file for complete search history.

(56) References Cited

U.S. PATENT DOCUMENTS

| | | | |
|---|---|---|---|
| 1,165,148 A | 12/1915 | Birchall | |
| 3,633,547 A | 1/1972 | Stevens et al. | |
| 3,734,057 A | 5/1973 | Lee et al. | |
| 3,889,881 A | 6/1975 | Cunningham et al. | |
| 4,175,515 A | 11/1979 | Bradley | |
| 4,181,623 A | 1/1980 | Dillarstone et al. | |
| 4,405,354 A * | 9/1983 | Thomas et al. ................ | 71/21 |
| 4,424,379 A | 1/1984 | Sprecker et al. | |
| 4,639,327 A | 1/1987 | McGaha | |
| 4,700,887 A | 10/1987 | Timmons | |
| 4,770,878 A | 9/1988 | Thomas | |
| 4,773,471 A | 9/1988 | Grant et al. | |
| 4,834,265 A | 5/1989 | Snyder | |
| 4,836,144 A | 6/1989 | Cole | |
| 5,054,434 A | 10/1991 | Wax et al. | |
| 5,063,880 A | 11/1991 | Bouthillier | |
| 5,233,940 A | 8/1993 | Berglund | |
| 5,574,093 A * | 11/1996 | States et al. ............. | 514/772.1 |
| 5,630,379 A | 5/1997 | Gerk et al. | |
| 5,718,887 A * | 2/1998 | Wolf et al. .................... | 424/65 |
| 5,736,032 A * | 4/1998 | Cox et al. ................... | 424/76.5 |
| 5,767,054 A * | 6/1998 | Sprugel et al. ............. | 510/383 |
| 5,865,143 A | 2/1999 | Moore, Jr. | |
| 5,890,454 A | 4/1999 | Moore, Jr. | |
| 5,958,334 A | 9/1999 | Haddon | |
| 6,177,070 B1 | 1/2001 | Lynch | |
| 6,194,470 B1 | 2/2001 | Lutz et al. | |
| 6,197,835 B1 | 3/2001 | Ganan-Calvo | |
| 6,230,660 B1 | 5/2001 | Greeson | |
| 6,237,860 B1 | 5/2001 | Ducey | |
| 6,302,161 B1 | 10/2001 | Heller et al. | |

* cited by examiner

Primary Examiner—John Pak

(57) ABSTRACT

An odor control product for treating digestible and odiferous organic waste to minimize odors includes about 12.5% adipic acid, about 70% alcohol, about 0.5% eucalyptus oil, and the remainder water. A variation of the product for use in an atomization system includes about 12.5% adipic acid, about 9% alcohol, about 17% vegetable oil, about 0.5% eucalyptus oil, and the remainder water. An associated method of treating digestible and odiferous organic waste to minimize odors includes the steps of preparing a solution of about 12.5% adipic acid, about 70% alcohol, about 0.5% eucalyptus oil, and the remainder water; and introducing the solution to the waste.

34 Claims, 1 Drawing Sheet

US 7,314,611 B2

SOLUTION AND METHOD FOR TREATING ORGANIC WASTE

CROSS-REFERENCES

This application is a continuation-in-part of U.S. application Ser. No. 10/292,556 filed Nov. 12, 2002, now U.S. Pat. No. 6,997,139 which claims the priority of provisional application Ser. No. 60/354,677, filed Feb. 5, 2002.

TECHNICAL FIELD

The present invention relates generally to the field of wastewater treatment and, more particularly, to a method and apparatus for dealing with odors emitted by primarily non-agricultural organic waste.

DESCRIPTION OF THE RELATED ART

The odors generated by and associated with decomposing organic waste present a continuing issue in many modern day applications. Prime examples of such applications include portable restroom facilities, sometimes referred to as "port-a-potties" or "port-a-johns", and grease storage pits.

Portable restrooms are used extensively worldwide in a variety of settings such as construction sites, sporting events, fairs, and other outdoor public events. These restrooms are usually self-contained enclosures that are just large enough for a single person. Portable restrooms contain a waste storage tank with an opening at its top. A vent tube allows air from the tank to circulate out of the restroom. A toilet seat is mounted over the tank opening. In some versions, a separate urinal is mounted on a wall of the restroom with a pipe leading from the urinal to the waste storage tank. Waste is pumped out of the tank once it is filled.

In certain settings, such as heavily attended sporting events or fairs, waste may accumulate in the tank fairly rapidly, thereby requiring more frequent pumping. In other settings where usage is lighter, the tanks may not be pumped for days or even weeks at a time. In both of these scenarios, a significant amount of waste may accumulate in the tanks producing offensive odors. These odors make further use of the restroom particularly unpleasant and unsanitary.

The portable restroom industry has attempted to address this issue by introducing various chemicals into the waste storage tank. The most prevalent of these chemicals is formaldehyde. While formaldehyde does offset the offensive odors produced by the waste to a degree, its own smell is not entirely pleasant. In addition, formaldehyde merely counteracts rather than attacking the mechanisms that create odors in the waste. Therefore, the initial charge of formaldehyde in the tank can be overwhelmed by larger amounts of waste unless additional formaldehyde is added to the tank. Furthermore, formaldehyde is thought to be a carcinogen. Therefore, exposure to the fumes generated by formaldehyde in an enclosed space, such as the enclosure of a portable restroom, should be minimized.

Grease storage pits, generally used by restaurants, particularly fast food restaurants, present another organic waste problem application. Large amounts of grease are added daily to these pits, while grease is pumped out of the pits fairly infrequently. The pit environment is not conducive to healthy decomposition of the organic waste in the pit and produces truly offensive odors.

A method of treating digestible and odiferous waste to minimize odors without the use of hazardous chemicals in applications such as those discussed above would be highly desirable.

The present invention is directed to overcoming one or more of the problems set forth above.

SUMMARY OF THE INVENTION

An aspect of the present invention is to provide a solution for and method of reducing emission of odiferous gasses from organic waste material.

The present invention provides an odor control product for treating digestible and odiferous organic waste to minimize odors, including:

about 10-15% adipic acid;

about 65-75% alcohol, wherein the alcohol (i) allows said adipic acid to enter into suspension in the presence of water, (ii) has disinfectant properties, and (iii) has antifreeze properties to inhibit said product from freezing;

an oil ingredient selected from the group consisting of about 15-20% vegetable oil, 0.1-2% eucalyptus oil, and mixtures thereof; and water The present invention further provides an odor control product for treating digestible and odiferous organic waste to minimize odors, including:

about 1.25-12.5% adipic acid;

about 7-12% alcohol, wherein the alcohol (i) allows said adipic acid to enter into suspension in the presence of water, (ii) has disinfectant properties, and (iii) has antifreeze properties to inhibit said product from freezing;

an oil ingredient selected from the group consisting of about 15-20% vegetable oil, 0.1-2% eucalyptus oil, and mixtures thereof; and water.

In accordance with the above aspect of the invention, there is provided an odor control product for treating digestible and odiferous organic waste to minimize odors that includes about 12.5% adipic acid, about 70% alcohol, about 0.5% eucalyptus oil, and the remainder water. An associated method of treating digestible and odiferous organic waste to minimize odors includes the steps of preparing a solution of about 12.5% adipic acid, about 70% alcohol, about 0.5% eucalyptus oil, and the remainder water; and introducing the solution to the waste.

This aspect is merely illustrative of the innumerable aspects associated with the present invention and should not be deemed as limiting in any manner. These and other aspects, features and advantages of the present invention will become apparent from the following detailed description when taken in conjunction with the drawings.

BRIEF DESCRIPTION OF THE DRAWINGS

Reference is now made to the drawings which illustrate the best known mode of carrying out the invention and wherein the same reference numerals indicate the same or similar parts throughout the several views.

DETAILED DESCRIPTION

Figure 1:
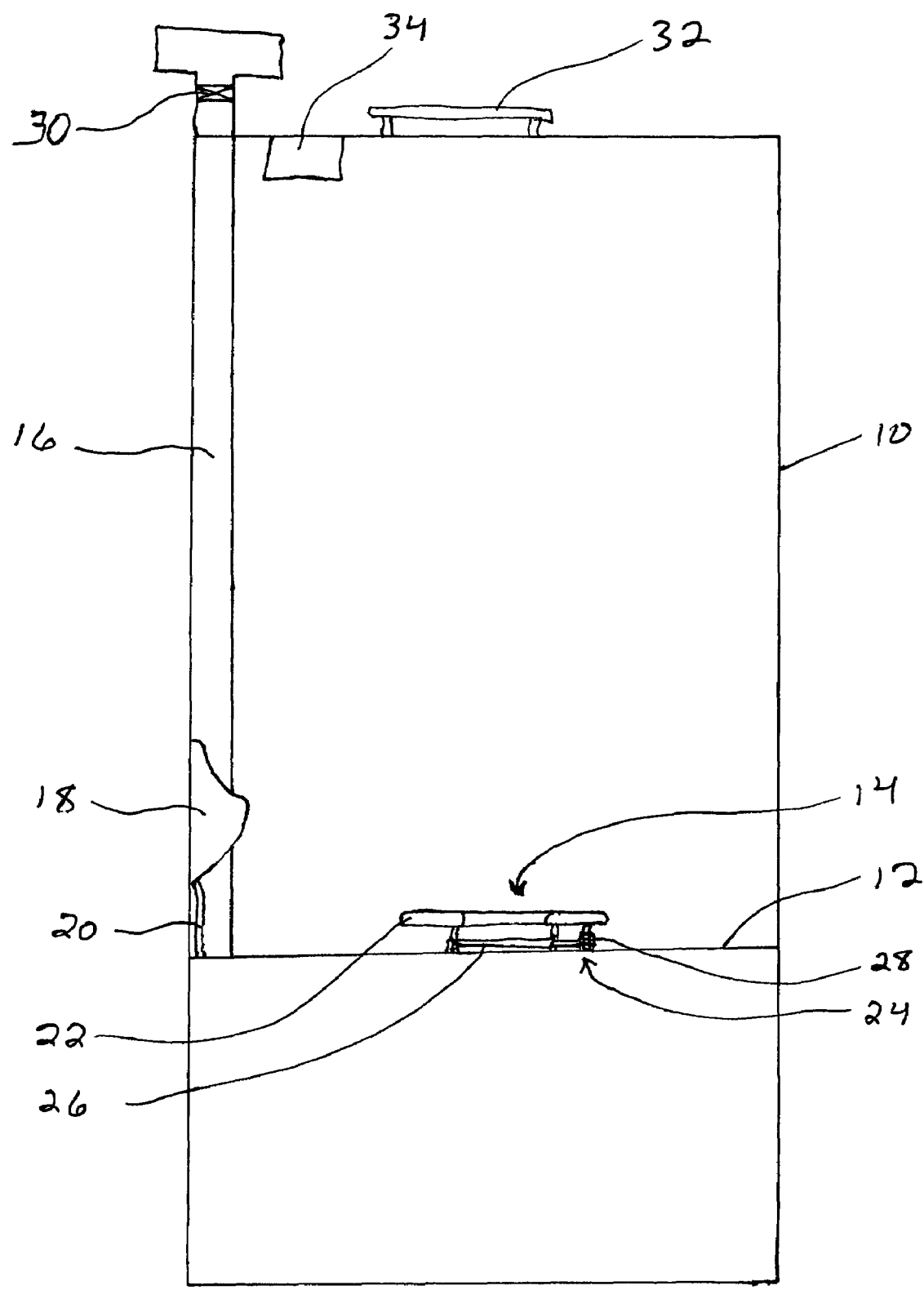
FIG. 1 is a schematic view of a portable restroom incorporating a system for treating digestible and odiferous organic waste.

A system and/or process according to embodiments of the present invention includes introducing a slightly acidic solution in a suitable form into an organic waste holding area. The solution is preferably a mixture including adipic acid, alcohol, eucalyptus oil, and water. The relative percentages of the ingredients in the solution advantageously include:

| | |
|---|---|
| Adipic acid powder | approximately 12.5% |
| Alcohol | approximately 70% |
| Eucalyptus oil | approximately 0.4% |
| Water | approximately 17% |

The relative percentages stated above are approximate, and reasonable variations of these percentages are within the scope of the claimed solution. In a preferred embodiment, the alcohol used is denatured ethanol alcohol. The denatured alcohol is initially 98% and is diluted to approximately 70% in the preferred embodiment. Any alcohol that allows adipic acid to enter into suspension, such as isophryl, will also work. In another preferred embodiment, the water is either distilled or de-ionized. A preferred method preparing the odor control solution includes first mixing the adipic acid and alcohol. Water is then added, followed by the eucalyptus oil.

The chemical name of adipic acid is hexanedioic acid or 1,4-butanedicarboxylic acid. It has an empirical formula of $C_6H_{10}O_4$ and a structural formula of COOH—$(CH_2)_4$—CCOH. Adipic acid is a white, odorless crystalline powder.

It is theorized that the solution creates an acid/base reaction with the waste. The solution increases the oxygen-reduction potential of the waste and encourages the activity of aerobic bacteria in the waste. As the alcohol component of the solution evaporates and produces vapors, these vapors carry the adipic acid into the head space above the waste.

The solution is provided in a variety of forms depending on the particular application. For use in portable restrooms, a concentrate of the solution according to the above formula is used. In a preferred embodiment, a light green color dye, for example, a few drops of standard food coloring, is added to the concentrate for enhanced visual appearance. Approximately ½ gallon of the concentrate is introduced into the waste storage tank of the restroom when it is placed in service. The concentrate is then diluted with approximately 5 gallons of water. Testing indicates that this initial charge will maintain its efficacy for 3 weeks or longer before requiring a recharge of the concentrate.

In urinal applications, the formulation stated above is again used in concentrate form. The concentrate is introduced to the urinal by a chemical injector with each flush at a rate of about 0.2 oz. per flush.

In an alternate urinal application, adipic acid powder is crystallized and formed into a block or cake. The block is preferably about 12% adipic acid powder, while the remaining elements of the block are variable but may include deodorants, detergents, water softeners or other desired chemicals.

A variation of the solution is applied via an atomization system to the surfaces of livestock holding facilities to control the odors generated by waste deposited thereon. In this embodiment, the following percentages of the four primary ingredients in the general solution plus vegetable oil are used to formulate the atomization system solution:

| | |
|---|---|
| Vegetable Oil | approximately 17% |
| Water | approximately 61% to 72.5% |
| Adipic Acid | approximately 1.25% to 12.5% |
| Alcohol | approximately 9% |
| Eucalyptus Oil | approximately 0.2% |

These percentages are approximate and reasonable variations therefrom are acceptable. Particularly good results have been achieved using a formula of 17.03% corn oil, 72.5% water, 1.25% adipic acid, 9.38% ethanol alcohol, and 0.16% eucalyptus oil. Advantageously, the percentage of adipic acid in the solution can be increased depending on the nature of odor-generating waste. However, as the percentage of adipic acid rises above 12.5%, the solution becomes saturated and additional adipic acid powder does not fully incorporate into the solution.

In the atomization system application, the vegetable oil provides a seal over the surface waste to minimize gasses emanating from the waste. The vegetable oil also serves to reduce dandruff and feed dust suspended in the air within the livestock storage facility. The vegetable oil, in addition to its other roles, serves as a barrier between the animals and the alcohol in the solution. In a preferred embodiment of the system, the odor control product utilizes corn oil. The adipic acid in the solution reacts with ammonia present in the air of the facility in an acid-base reaction, thereby reducing the level of ammonia in the air. The alcohol serves both as a disinfectant by destroying bacteria in the air and on the surfaces of the facility and as an antifreeze to prevent the product from freezing in the system. In the preferred embodiment of the atomization system, ethanol alcohol is used. Water is added to the product to further dilute the vegetable oil, decreasing the oil's viscosity and aiding atomization of the product. In the preferred embodiment, distilled water is used in the odor control product. In a particularly advantageous embodiment, the odor control product is blended and then passed through a filter which removes particles larger than one micron (1µ) in size. This minimizes the occurrence of clogged nozzles in the atomization system.

While the solution has been described in connection with the treatment of human and livestock waste in various applications, it should be appreciated that the solution is effective for the treatment of other forms of organic waste in various applications, such as grease pits and other non-human animal waste.

A preferred system for using the solution in a portable restroom application is illustrated in FIG. 1. The restroom includes an enclosure 10, a waste storage tank 12 having an opening 14, and a vent tube 16. The bottom of the vent tube 16 opens into the tank 12, while the top of the vent tube 16 opens to the outside atmosphere above the enclosure 10. The restroom also includes a urinal 18 with a tube 20 that allows urine to drain from the urinal 18 into the tank 12.

A toilet seat 22 is mounted above the opening 14 of the tank 12. The seat is provided with a shutter device 24. The shutter device 24 is mounted immediately beneath a toilet seat 22 and above the tank 12. The shutter device 24 has a structure similar to that of a camera shutter, including a plurality of slidably interconnected panels 26 arranged in a single helix. The panels 26 are controlled by a spring-loaded lever and pin combination 28. When no one is sitting on the toilet seat 22, the lever/pin combination 28 is biased by the spring in an upward position and holds the panels 26 in a closed position. However, the force of an individual sitting down on the seat 22 overcomes the spring force holding the lever/pin combination 28 in the closed position, forcing the pin and lever downward. The lever/pin combination 28 opens the panels 26 so the tank 12 is open to the toilet seat 22. Once the individual stands up the lever/pin combination 28 immediately moves upward due to the spring biasing and back to the closed position, thereby closing the panels 26. The shutter device 24 reduces the release of odiferous gasses from the tank as well as providing a more appealing environment for users.

A fan 30 is mounted at the top end of the vent tube 16. The fan 30 is powered by a solar generator 32. In a preferred embodiment, the solar generator 32 is connected to a rechargeable battery 34. In this embodiment, a 5 watt solar generator and a 44 cfm fan that consumes approximately 2.6 watts is used. The excess generating by the solar generator is stored by the battery, thereby providing a power source for the fan during those times when the solar generator is inoperable. The fan 30 operates to help remove odiferous gasses from the enclosure 10 and increases the available oxygen for aerobic organisms in the waste and may speed up the exchange of carbon dioxide and oxygen at the surface interface of the waste.

It should be understood that the solution in the above description encompasses embodiments that may include unspecified trace elements that are generally found in typical water sources.

Other objects, features and advantages will be apparent to those skilled in the art. The invention in its broader aspects is not limited to the specific steps and apparatus shown and described but departures may be made therefrom within the scope of the appended claims without departing from the principles of the invention and without sacrificing the chief advantages.

What is claimed is:

1. An odor control product for treating digestible and odiferous organic waste to minimize odors, including:
    about 10-15% adipic acid;
    about 65-75% alcohol, wherein the alcohol (i) allows said adipic acid to enter into suspension in the presence of water, (ii) has disinfectant properties, and (iii) has antifreeze properties to inhibit said product from freezing;
    an oil ingredient selected from the group consisting of about 15-20% vegetable oil, 0.1-2% eucalyptus oil, and mixtures thereof; and
    water.

2. An odor control product for treating digestible and odiferous organic waste to minimize odors as set forth in claim 1, wherein said eucalyptus oil is present in the product.

3. An odor control product for treating digestible and odiferous organic waste to minimize odors as set forth in claim 1, wherein the product includes about 12.5% adipic acid, about 70% said alcohol, said oil ingredient, and the remainder water.

4. An odor control product for treating digestible and odiferous organic waste to minimize odors as set forth in claim 2, wherein the product includes about 12.5% adipic acid, about 70% said alcohol, about 0.5% eucalyptus oil, and the remainder water.

5. An odor control product for treating digestible and odiferous organic waste to minimize odors as set forth in claim 1, wherein the water is distilled.

6. An odor control product for treating digestible and odiferous organic waste to minimize odors as set forth in claim 1, wherein the water is de-ionized.

7. An odor control product for treating digestible and odiferous organic waste to minimize odors as set forth in claim 2, wherein the product includes about 10-15% adipic acid, about 65-75% said alcohol, about 0.25-2% eucalyptus oil, and the remainder water.

8. An odor control product for treating digestible and odiferous organic waste to minimize odors as set forth in claim 1, wherein said vegetable oil is present in the product.

9. An odor control product for treating digestible and odiferous organic waste to minimize odors as set forth in claim 8, wherein the vegetable oil is corn oil.

10. An odor control product for treating digestible and odiferous organic waste to minimize odors as set forth in claim 8, further including eucalyptus oil.

11. An odor control product for treating digestible and odiferous organic waste to minimize odors as set forth in claim 8, wherein the odor control product is filtered after blending to remove particles larger than approximately one micron in size.

12. An odor control product for treating digestible and odiferous organic waste to minimize odors as set forth in claim 1, wherein said alcohol is ethanol.

13. A method of treating digestible and odiferous organic waste to minimize odors including the steps of:
    preparing the product of claim 1; and
    introducing the product to the waste.

14. A method of treating digestible and odiferous organic waste to minimize odors including the steps of:
    preparing the product of claim 2; and
    introducing the product to the waste.

15. A method of treating digestible and odiferous organic waste to minimize odors including the steps of:
    preparing the product of claim 3; and
    introducing the product to the waste.

16. A method of treating digestible and odiferous organic waste to minimize odors including the steps of:
    preparing the product of claim 4; and
    introducing the product to the waste.

17. A method of treating digestible and odiferous organic waste to minimize odors including the steps of:
    preparing the product of claim 5; and
    introducing the product to the waste.

18. A method of treating digestible and odiferous organic waste to minimize odors including the steps of:
    preparing the product of claim 6; and
    introducing the product to the waste.

19. A method of treating digestible and odiferous organic waste to minimize odors including the steps of:
    preparing the product of claim 7; and
    introducing the product to the waste.

20. A method of treating digestible and odiferous organic waste to minimize odors including the steps of:
    preparing the product of claim 8; and
    introducing the product to the waste.

21. A method of treating digestible and odiferous organic waste to minimize odors including the steps of:
    preparing the product of claim 9; and
    introducing the product to the waste.

22. A method of treating digestible and odiferous organic waste to minimize odors including the steps of:
    preparing the product of claim 10; and
    introducing the product to the waste.

23. A method of treating digestible and odiferous organic waste to minimize odors including the steps of:
    preparing the product of claim 11; and
    introducing the product to the waste.

24. A method of treating digestible and odiferous organic waste to minimize odors including the steps of:
    preparing the product of claim 12; and
    introducing the product to the waste.

25. An odor control product for treating digestible and odiferous organic waste to minimize odors, including:
  about 1.25-12.5% adipic acid;
  about 7-12% alcohol, wherein the alcohol (I) allows said adipic acid to enter into suspension in the presence of water, (ii) has disinfectant properties, and (iii) has antifreeze properties to inhibit said product from freezing;
  an oil ingredient selected from the group consisting of about 15-20% vegetable oil, 0.1-2% eucalyptus oil, and mixtures thereof; and
  water.

26. An odor control product for treating digestible and odiferous organic waste to minimize odors as set forth in claim 25, wherein the product includes about 12.5% adipic acid, about 9% said alcohol, about 17% vegetable oil, and the remainder water.

27. An odor control product for treating digestible and odiferous organic waste to minimize odors as set forth in claim 25, wherein the product includes about 12.5% adipic acid, about 9% said alcohol, about 17% vegetable oil, about 0.2% eucalyptus oil, and the remainder water.

28. An odor control product for treating digestible and odiferous organic waste to minimize odors as set forth in claim 25, wherein the product includes about 1.25-12.5% adipic acid, about 7-12% said alcohol, about 15-20% vegetable oil, about 0.1-2% eucalyptus oil, and the remainder water.

29. An odor control product for treating digestible and odiferous organic waste to minimize odors as set forth in claim 25, wherein said alcohol is ethanol.

30. A method of treating digestible and odiferous organic waste to minimize odors including the steps of:
  preparing the product of claim 25; and
  introducing the product to the waste.

31. A method of treating digestible and odiferous organic waste to minimize odors including the steps of:
  preparing the product of claim 26; and
  introducing the product to the waste.

32. A method of treating digestible and odiferous organic waste to minimize odors including the steps of:
  preparing the product of claim 27; and
  introducing the product to the waste.

33. A method of treating digestible and odiferous organic waste to minimize odors including the steps of:
  preparing the product of claim 28; and
  introducing the product to the waste.

34. A method of treating digestible and odiferous organic waste to minimize odors including the steps of:
  preparing the product of claim 29; and
  introducing the product to the waste.

* * * * *